C. J. Hauck.
Flower-Stand.

N° 73005. Patented Jan. 7, 1868.

Witnesses
John C. Poller
Gustav Berg

Inventor
Chas. J. Hauck
pr
Van Santvoord & Hauff
Attys

United States Patent Office.

CHARLES J. HAUCK, OF WILLIAMSBURG, NEW YORK.

Letters Patent No. 73,005, dated January 7, 1868.

IMPROVED FLOWER-STAND.

*The Schedule referred to in these Letters Patent and making part of the same.*

TO ALL WHOM IT MAY CONCERN:

Be it known that I, CHARLES J. HAUCK, of 26 Stagg street, Williamsburg, in the county of Kings, and in the State of New York, have invented a new and useful Improvement in Flower-Stands; and I do hereby declare that the following is a full, clear, and exact description thereof, which will enable those skilled in the art to make and use the same, reference being had to the accompanying drawing, forming part of this specification, in which drawing—

Figure 1 represents a vertical section of this invention.

Similar letters indicate corresponding parts.

Figure 3:
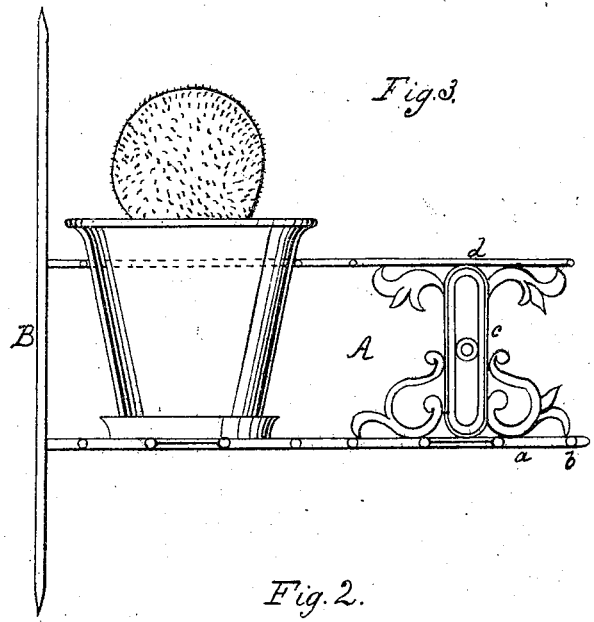
Figure 2:
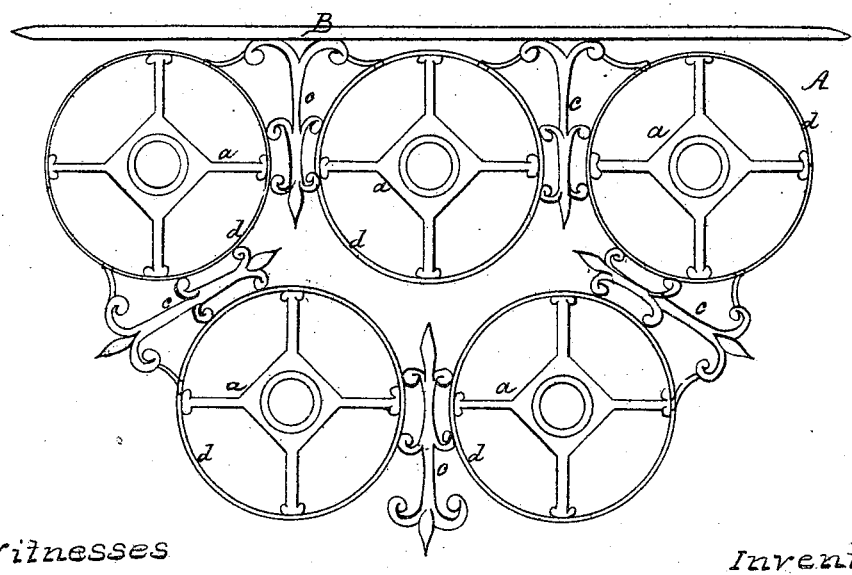
Figure 2 is a plan or top view of the same.

This invention relates to a flower-stand composed of a series of sections, each of which is composed of a supporting-platform and of a guide-ring. The platform is made of a wire ring provided with a suitable centre-piece, and fastened between uprights, the upper ends of which form the supports for the guide-rings, the centre-piece and uprights being cast and secured to the rings by solder in such a manner that a simple, cheap, durable, and highly-ornamental flower-stand is obtained, particularly fit for diminutive pots containing exotic plants.

A represents a flower-stand, which is composed of a series of sections, which are connected together so as to produce any desirable form or shape. Each section is composed of a platform, $a$, which consists of a ring, $b$, with a suitable centre-piece, the ring being made of iron or other wire, and secured to the centre-piece by solder or in any other suitable manner. To the outer periphery of the ring $b$ are secured two standards $c$, to the upper ends of which is connected the guide-ring $d$. The centre-piece of the platform and the standards $c$ are cast of tin or any other suitable metal or alloy, while the guide-ring $d$ is made of iron or other wire. The object of this guide-ring is to steady the flower-pots, and retain them firmly in position. In fitting up a flower-stand, a number of these sections are connected together, and either secured to a bracket, B, as shown in the drawing, or provided with legs, or arranged to be suspended from a cord or cords, according to taste and convenience.

What I claim as new, and desire to secure by Letters Patent, is—

A flower-stand, composed of one or more sections, each made of a platform, $a$, with a ring, $b$, and one or more standards, $c$, supporting a guide-ring, $d$, all as shown and described.

C. J. HAUCK.

Witnesses:
 W. HAUFF,
 JOHN C. POLLER.